(12) United States Patent
Norris

(10) Patent No.: US 11,578,510 B2
(45) Date of Patent: Feb. 14, 2023

(54) ACTUATOR APPARATUS AND RELATED METHODS FOR USE WITH VEHICLE LOCKS

(71) Applicant: TOYOTA MOTOR ENGINEERING & MANUFACTURING NORTH AMERICA, INC., Plano, TX (US)

(72) Inventor: Justin Norris, Brighton, MI (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 865 days.

(21) Appl. No.: 16/522,816

(22) Filed: Jul. 26, 2019

(65) Prior Publication Data

US 2021/0025202 A1 Jan. 28, 2021

(51) Int. Cl.
  *B62D 33/027* (2006.01)
  *B62D 33/037* (2006.01)
  *E05B 81/56* (2014.01)
  *E05B 79/04* (2014.01)
  *E05B 81/16* (2014.01)

(52) U.S. Cl.
  CPC ............ *E05B 81/56* (2013.01); *B62D 33/027* (2013.01); *B62D 33/037* (2013.01); *E05B 79/04* (2013.01); *E05B 81/16* (2013.01); *E05Y 2900/546* (2013.01)

(58) Field of Classification Search
  CPC ... B62D 33/0273; B62D 33/037; E05B 81/16; E05B 81/56; E05B 79/04; E05Y 2900/546
  See application file for complete search history.

(56) References Cited

U.S. PATENT DOCUMENTS

| 4,642,432 | A | | 2/1987 | Ring | |
| 6,030,019 | A | * | 2/2000 | Stiltner | B62D 33/037 70/120 |
| 6,123,384 | A | * | 9/2000 | Eustache | B60J 1/1884 15/250.31 |
| 6,209,366 | B1 | * | 4/2001 | Zagoroff | E05B 77/44 292/DIG. 3 |
| 7,019,233 | B2 | | 3/2006 | Spies | |
| 7,078,640 | B2 | * | 7/2006 | Miyake | H01H 21/04 200/341 |
| 7,714,241 | B2 | | 5/2010 | Searle et al. | |
| 8,324,518 | B2 | | 12/2012 | Furrer | |

(Continued)

FOREIGN PATENT DOCUMENTS

JP 4578403 B2 11/2010

*Primary Examiner* — Gregory A Blankenship
(74) *Attorney, Agent, or Firm* — Oblon, McClelland, Maier & Neustadt, L.L.P.

(57) ABSTRACT

Actuator apparatus and related methods for use with vehicle locks are disclosed. A disclosed locking system for a vehicle includes a movable component of the vehicle and a lock operatively coupled to the movable component. The locking system also includes an actuator assembly. The actuator assembly includes a housing coupled to a vehicle body, an actuator supported by the housing, and a linkage mechanism connecting the actuator to the lock. The locking system also includes an input device supported by the housing. Activation of the input device causes the actuator to change a state of the lock.

19 Claims, 7 Drawing Sheets

(56) References Cited

U.S. PATENT DOCUMENTS

| | | | | |
|---|---|---|---|---|
| 8,532,873 | B1* | 9/2013 | Bambenek | B62D 33/037 340/687 |
| 8,740,279 | B1* | 6/2014 | McGoff | B62D 33/0273 49/168 |
| 9,269,512 | B2 | 2/2016 | Colonna et al. | |
| 9,994,263 | B1* | 6/2018 | Richter | B60P 1/435 |
| 11,247,700 | B2* | 2/2022 | Zhu | B60W 60/001 |
| 2006/0006676 | A1* | 1/2006 | Plett | B62D 33/0273 292/300 |
| 2006/0226672 | A1* | 10/2006 | Ruhlander | B62D 33/0273 296/50 |
| 2011/0140461 | A1* | 6/2011 | Murray | E05B 79/20 292/216 |
| 2014/0136021 | A1* | 5/2014 | Bambenek | B62D 33/037 49/357 |
| 2016/0160553 | A1* | 6/2016 | Nania | E05F 15/627 296/50 |
| 2016/0368543 | A1* | 12/2016 | Puscas | B62D 33/03 |
| 2019/0080859 | A1 | 3/2019 | Jameson et al. | |
| 2019/0093411 | A1 | 3/2019 | Fukui | |
| 2019/0108954 | A1 | 4/2019 | Kobayashi et al. | |
| 2019/0271181 | A1* | 9/2019 | Gorey | B62D 33/037 |
| 2020/0199917 | A1* | 6/2020 | Borlodan | E05B 81/16 |
| 2021/0245817 | A1* | 8/2021 | Gibbs | B62D 33/0276 |

* cited by examiner

ACTUATOR APPARATUS AND RELATED METHODS FOR USE WITH VEHICLE LOCKS

FIELD OF THE DISCLOSURE

This disclosure relates generally to vehicles and, more particularly, to actuator apparatus and related methods for use with vehicle locks.

BACKGROUND

Vehicles typically employ locking systems to facilitate control of movable vehicle components such as, gates, doors, etc. These locking systems may include a controllable lock (e.g., a gate lock, a door lock, etc.) operatively coupled to such a movable component of a vehicle. The lock is configured to temporally prevent movement of the component or lock the component in place until a user interacts with the locking system. Such locking systems improve vehicle safety by allowing a user to selectively secure and unsecure movable components of a vehicle.

SUMMARY

An example locking system for a vehicle includes a movable component of the vehicle and a lock operatively coupled to the movable component. The locking system also includes an actuator assembly. The actuator assembly includes a housing coupled to a vehicle body, an actuator supported by the housing, and a linkage mechanism connecting the actuator to the lock. The locking system also includes an input device supported by the housing. Activation of the input device causes the actuator to change a state of the lock.

An example apparatus includes an input device for a vehicle lock and an actuator assembly. The actuator assembly includes an actuator connected to the vehicle lock. The actuator is configured to change a state of the vehicle lock when a user interacts with the input device. The actuator assembly also includes a housing supporting the input device and the actuator. The input device is positioned on an exterior portion of the housing.

An example method for assembling an actuator assembly of a vehicle locking system includes coupling an actuator of the actuator assembly to a housing of the actuator assembly. The method also includes coupling an input device to the housing. The method also includes coupling the housing to a vehicle body. The method also includes connecting the actuator to a vehicle lock that is operatively coupled to a movable vehicle component. The method also includes connecting the input device to the actuator. Activation of the input device causes the actuator to change a state of the vehicle lock The foregoing paragraphs have been provided by way of general introduction, and are not intended to limit the scope of the following claims.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

In general, the same reference numbers will be used throughout the drawing(s) and accompanying written description to refer to the same or like parts.

DETAILED DESCRIPTION

Figure 1A:
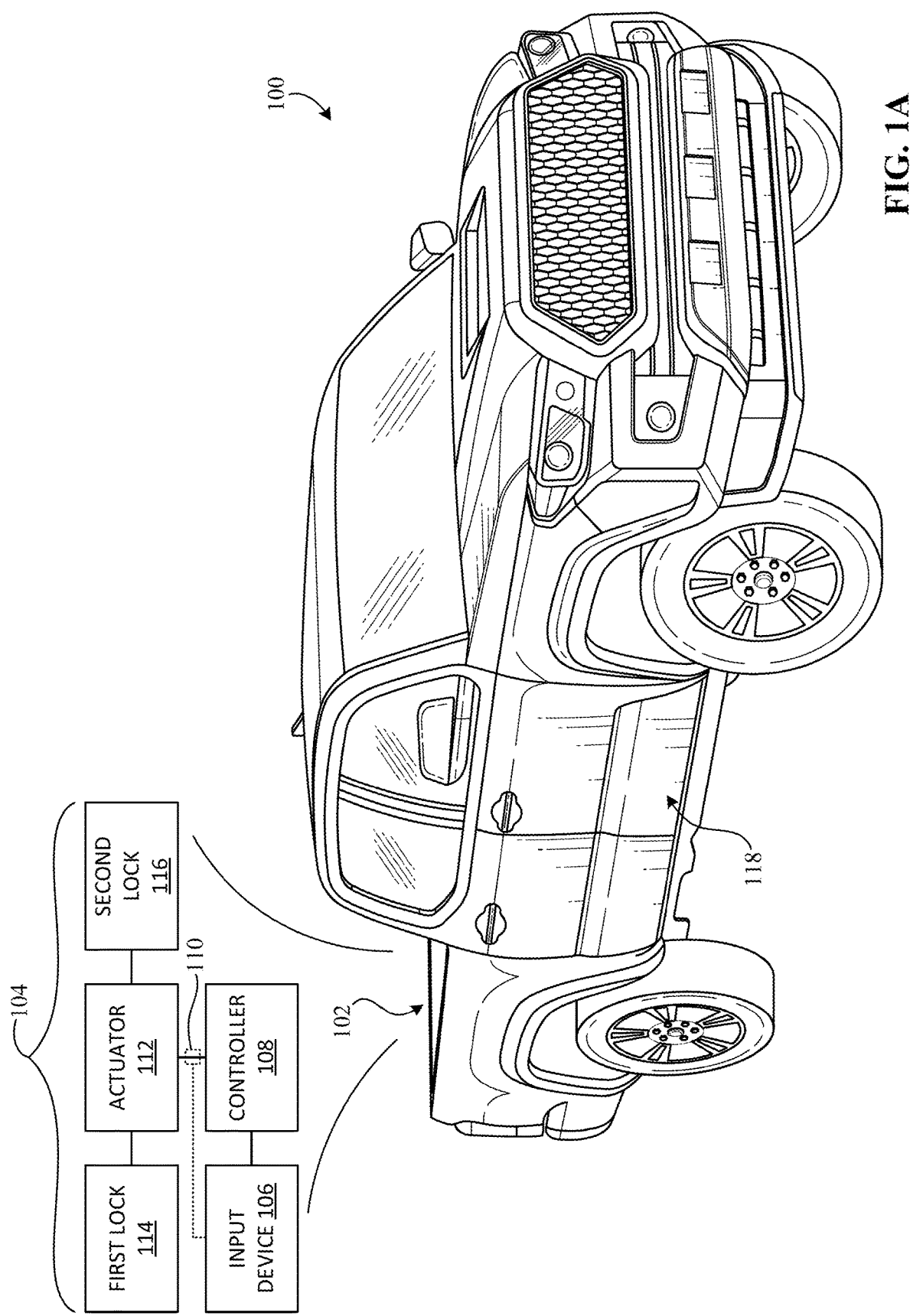
FIG. 1A is a view of an example vehicle in which examples disclosed herein can be implemented.

Some known vehicle locking systems include a known actuator assembly that is configured to control a lock of a vehicle via a motorized actuator (e.g., a linear actuator, a rotary actuator, etc.). Such known vehicle locking systems also include a switch communicatively coupled to the actuator to allow a user to control the actuator and, thus, change the state of the lock by interacting with the switch (e.g., pressing a button associated with the switch). In particular, these known vehicle locking systems are configured such that the switch is positioned in a handle space and/or coupled to a handle (e.g., one of a gate handle, a door handle, etc.) of the vehicle that is separate from the actuator assembly. Alternatively, to similarly support the switch, some of these known vehicle locking systems are configured such that the switch is coupled to a body of the vehicle that is separate from the actuator assembly. However, the handle and/or the body have relatively complex designs and mounting structures such as brackets to sufficiently support to the switch, which incur substantial costs. As a result, these known vehicle locking systems are time consuming and/or expensive to produce.

Actuator apparatus and related methods for use with vehicle locks are disclosed. Examples disclosed herein provide an example input device (e.g., a switch) for one or more example locks of a vehicle. For example, a first disclosed lock (e.g., a gate lock) is operatively coupled to a movable, exterior component (e.g., a gate such as a tailgate) of the vehicle to prevent movement of the component when the first lock is in a locked state. Additionally, examples disclosed herein also provide an example actuator assembly including a housing (e.g., a plate), an actuator (e.g., an electric actuator such as linear actuator), and a linkage mechanism connecting the actuator to the lock(s). The disclosed input device is communicatively coupled to (e.g., directly or via a vehicle controller) a relay interposed between the actuator and a power source of the vehicle. Activation of the input device causes the relay to supply power to the actuator and, as a result, causes the actuator to control the lock(s). The disclosed housing is configured to couple (e.g., removably couple) to a body of the vehicle such as, for example, part of the movable, exterior component. In particular, the housing is sized, shaped, structured, and/or otherwise configured to receive and carry both the actuator and the input device along with at least part of the linkage mechanism, which is discussed in greater detail below in connection with FIGS. 1-6. By supporting the input device via a portion of the actuator assembly, disclosed examples simplify design complexity by removing and/or eliminating body mounting structures that would have otherwise been required to assemble the above-mentioned known vehicle locking systems. As a result, disclosed examples reduce production time and/or related costs typically associated with the above-mentioned known vehicle locking systems.

In some examples, the input device is coupled (e.g., removably coupled) to a support portion (e.g., an exterior plate) of the housing, for example, via an example fastening mechanism (e.g., one or more bolted joints). In such examples, the support portion extends away from a central area of the housing to receive the input device at or adjacent an end of the support portion. Thus, disclosed examples incorporate holding functionality for the input device into the actuator assembly. When the actuator assembly (including the input device coupled thereto) is couple to the vehicle body, the input device is positioned exterior relative to the vehicle such that the user can access the input device from a location outside of a vehicle cabin near the movable component.

FIG. 1A is a view of a vehicle (e.g., a truck, a car, a van, a sport utility vehicle (SUV), etc.) 100 in which examples disclosed herein can be implemented. According to the illustrated example of FIG. 1A, the vehicle 100 includes a gate 102 and a locking system (e.g., a vehicle gate or door locking system) 104 for the gate 102. The locking system 104 of FIG. 1A includes an input device 106, a controller 108, a relay (switching device) 110, an actuator 112, and one or more locks 114, 116, two of which are shown in this example (i.e., a first lock 114 and a second lock 116). The locking system 104 is configured to prevent the gate 102 from moving when the first lock 114 is in a first state (e.g., a locked state) thereof and/or the second lock 116 is in a first state (e.g., a locked state). In particular, in response to a user or person interacting with the input device 106, the actuator 112 is configured to control the first lock 114 and/or the second lock 116 to allow movement of the gate 102, as discussed further below in connection with FIGS. 1B and 2-6.

The gate 102 of FIG. 1A can be implemented, for example, using one of a tailgate, a swing gate, a lift gate, etc. As shown in FIG. 1A, the gate 102 is a tailgate. In particular, the gate 102 is movably coupled to the vehicle 100 such that the gate 102 is movable between different positions such as, for example, an open position and a closed position.

The input device 106 of FIG. A facilitates interactions and/or communications between the locking system 104 and one or more end users. The input device 106 of FIG. 1A can be implemented, for example, using a switch such as one of a pushbutton switch, a capacitive switch, a proximity switch, etc. The input device 106 is communicatively coupled to the controller 108 for example, via a transmission or signal wire, a bus, radio frequency, etc. According to the illustrated example of FIG. 1A, the input device 106 is configured to provide a signal to the controller 108 when a user interacts with (e.g., pushes or presses) the input device 106. In such examples, in response to receiving the signal, the controller 108 controls the relay 110 (e.g., via transmitting an electrical current to the relay 110) to supply or provide electrical power to the actuator 112, thereby actuating the actuator 112. In this manner, the input device 106 controls the actuator 112 to change the state(s) of the respective lock(s) 114, 116. Alternatively, in some vehicle applications, the input device 106 is communicatively coupled directly to the relay 110, instead of the controller 108. In such examples, to actuate the actuator 112, the input device 106 is configured to similarly control the relay 110 (e.g., via transmitting an electrical current to the relay 110) to provide the electrical power to the actuator 112 when the user interacts with the input device 106. Thus, the relay 110 of FIG. 1A is configured to provide the electrical power to the actuator 112 when the relay 110 receives an electrical current from (a) the input device 106 or (b) the controller 108. In such examples, the input device 106 is considered to be connected to the actuator 112 via the relay 110 and/or the controller 108.

The controller 108 of FIG. 1A facilitates control of the relay 110 via the input device 106. The controller 108 of FIG. 1A can be implemented, for example, using one or more electronic control units (ECUs) such as a body ECU, a smart ECU, etc. According to the illustrated example of FIG. 1A, the controller 108 is communicatively coupled between the input device 106 and the relay 110, for example, via a transmission or signal wire, a bus, radio frequency, etc. In such examples, the controller 108 is configured to receive one or more signals (e.g., corresponding to a user selection indicative of unlocking the gate 102) from the input device 106 and, in response, provide the electrical current to relay 110.

The relay 110 of FIG. 1A facilitates supplying the electrical power to the actuator 112. The relay 110 of FIG. 1A can be implemented, for example, using an electromagnetic relay, a solid state relay, etc. According to the illustrated example of FIG. 1A, the relay 110 is operatively interposed between the actuator 112 and a power source (e.g., a battery of the vehicle 100) for the locking system 104. In particular, the relay 110 is configured to transmit the electrical power from the power source to the actuator 112 when the relay 110 is in a first position (e.g., a closed position) thereof. Conversely, the relay 110 is configured to cease transmission of the electrical power from the power source to the actuator 112 when the relay 110 is in a second position (e.g., an open position) thereof. That is, the relay 110 of FIG. 1A is changeable between the first and second positions thereof based on the electrical current provided to the relay 110, for example, from the controller 108 or the input device 106. As such, the relay 110 is communicatively coupled between the actuator 112 and one of (a) the input device 106, (b) the controller 108, or (c) the input device 106 via the controller 108.

The actuator 112 of FIG. 1A facilitates changing the state(s) of the lock(s) 114, 116, for example, via converting electrical energy into kinetic energy. The actuator 112 of FIG. 1A can be implemented, for example, using an electric actuator such a linear actuator, a rotary actuator, etc. As such, the actuator 112 is configured to generate an output (e.g., a force and/or a torque) in response to receiving the electrical power. In particular, the actuator 112 is operatively coupled to the first lock 114 and/or the second lock 116 such that the output generated by the actuator 112 controls the lock(s) 114, 116, for example, via the linkage mechanism 204 discussed below.

The first lock 114 of FIG. 1A can be implemented, for example, using a vehicle lock or latch (e.g., one of a tailgate lock, a swing gate lock, a lift gate lock, a door lock, a luggage door lock, etc.). According to the illustrated example of FIG. 1A, the first lock 114 is operatively coupled to the gate 102 and configured such that, when the first lock 114 is in the first state thereof, the first lock 114 prevents the gate 102 from moving away from the first position thereof. In other words, the gate 102 of FIG. 1A substantially remains in the first position thereof when the first lock 114 is locked. On the other hand, when the first lock 114 is in a second state (e.g., an unlocked state) thereof, the gate 102 is movable relative to the vehicle 100 such that the user can open the gate 102. That is, the first lock 114 of FIG. 1A is changeable between the first and second states thereof via a particular force applied to an input portion (e.g., a lever) of the first lock 114. In particular, the first lock 114 is connected to the actuator 112 to receive the output generated by the actuator 112.

Further, in examples where the gate 102 is a tailgate, the second lock 116 is operatively coupled to the gate 102, similar to the first lock 114. That is, when configured for use with a tailgate, the locking system 104 includes the two locks 114, 116. In such examples, the second lock 116 is likewise changeable, based on the output of the actuator, between the first state thereof and a second state (e.g., an unlocked state) thereof to limit movement of the gate 102.

Although FIG. 1A depicts the gate 102, in some examples, the locking system 104 is implemented in the vehicle 100 differently. In some examples, the locking system 104 is configured for use with a different movable component of the vehicle 100 in addition or alternatively to the gate 102 such as, for example, a vehicle door (e.g., a conventional car door, a sliding door, etc.) 118. In such examples, the locking system 104 includes one or more locks 114, 116 (e.g., a single lock 114, 116) that is/are controllable by the actuator 112 and operatively coupled to the vehicle door 118. As such, the locking system 104 of FIG. 1A can be advantageously used for positional control of any such movable component of the vehicle 100.

Figure 1B:
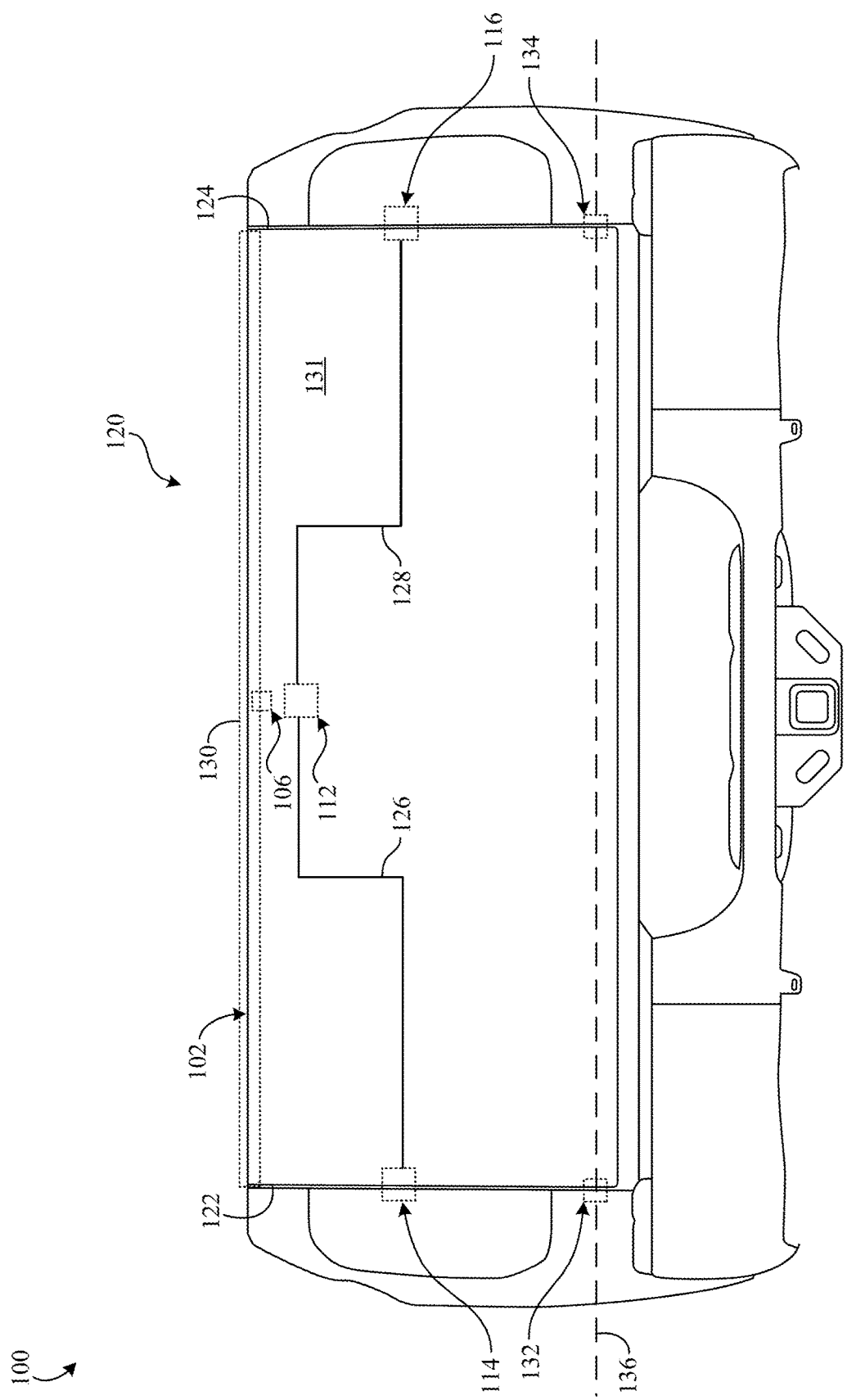
FIG. 1B is another view of the example vehicle of FIG. 1A and shows an example lock configuration in accordance with the teachings of this disclosure.

FIG. 1B is another view of the vehicle 100 and shows a lock configuration 120 in accordance with the teachings of this disclosure. As shown in FIG. 1B, the first lock is 114 is positioned on a first side 122 of the gate 102. The second lock 116 of FIG. 1B is positioned on a second side 124 of the gate 102 opposite the first side 122. The actuator 112 of FIG. 1B is positioned between the first and second locks 114, 116.

According to the illustrated example of FIG. 1B, the first lock 114 is connected to the actuator 112 to receive the output generated by the actuator 112, for example, via a first link (e.g., a rod, a cable, etc.) 126 extending from the actuator 112 to the first lock 114. In such examples, the first link 126 is configured to transmit a force from the actuator 112 to the input portion of the first lock 114 to operate the first lock 114. Similarly, the second lock 116 of FIG. 1B is connected to the actuator 112 to receive the output generated by the actuator 112, for example, via a second link (e.g., a rod, a cable, etc.) 128 extending from the actuator 112 to the second lock 116. In such examples, the second link 128 is configured to transmit a force from the actuator 112 to an input portion (e.g., a lever) of the second lock 116 to operate the second lock 116.

Additionally, the input device 106 of FIG. 1B is positioned on or adjacent a component of the gate 102 such as, for example, a vehicle spoiler 130 (as represented by the dotted/dashed lines of FIG. 1B). In particular, the input device 106 of FIG. 1B is exterior relative to the vehicle 100 and/or the gate 102, which allows the user to access the input device 106 when the user is outside of a cabin of the vehicle 100. For example, a component (e.g., a button) associated with the input device 106 is adjacent an exterior surface 131 of the vehicle 100. In such examples, the input device 106 forms and/or defines at least a portion of the spoiler 130.

In some examples, to facilitate movement of the vehicle gate 102, the vehicle 100 also includes one or more example movable joints (e.g., a pin joint, a hinge joint, etc.) 132, 134 operatively coupled to the gate 102, two of which are shown in this example (as represented by the dotted/dashed lines of FIG. 1). In particular, when the first lock 114 is in the first state thereof and/or the second lock 116 is in the second state thereof, the gate 102 is pivotable relative to the joint(s) 132, 134 and/or a first axis 136 associated with the joint(s) 132, 134 in a first direction (e.g., clockwise) and a second direction (e.g., counterclockwise) opposite the first direction.

Figure 2:
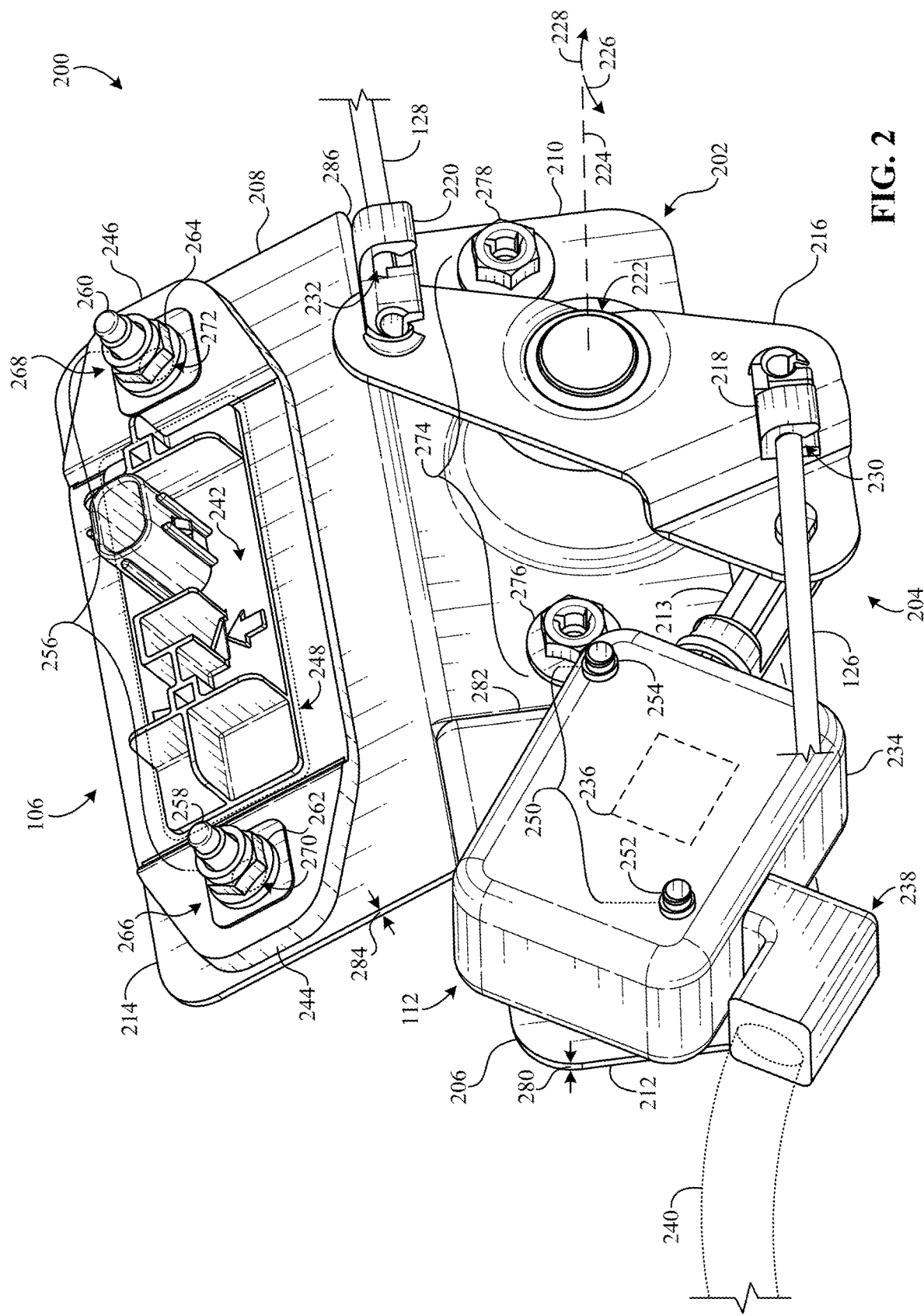
FIGS. 2-5 are views of an example actuator assembly in accordance with the teachings of this disclosure.

FIG. 2 is a view of an example actuator assembly 200 in accordance with the teachings of this disclosure. In some examples, the actuator assembly 200 of FIG. 2 is implemented in the locking system 104 of FIG. 1. That is, in such examples, the locking system 104 includes the actuator assembly 200. According to the illustrated example of FIG. 2, the actuator assembly 200 includes the actuator 112 and a primary or first housing 202. In particular, the first housing 202 of FIG. 2 is supporting the input device 106 and the actuator 112. Additionally, in some examples, to connect the actuator 112 to the lock(s) 114, 116, the actuator assembly 200 of FIG. 2 also includes a linkage mechanism 204 supported by the first housing 202.

The first housing 202 of FIG. 2 is sized, shaped, structured, and/or otherwise configured to receive and carry both (a) the input device 106 and (b) the actuator 112. According to the illustrated example of FIG. 2, the first housing 202 includes a first portion 206, a second portion 208, and a third portion 210 coupled between the first and second portions 206, 208. As shown in FIG. 2, the first portion 206 extends away from the third portion 210 to receive the actuator 112 at or adjacent a first end 212 of the first portion 206. That is, the actuator 112 of FIG. 2 is positioned on the first housing portion 206 at or adjacent the first end 212 thereof. Further, the second portion 208 of FIG. 2 extends away from the third portion 210 to receive the input device 106 at or adjacent a first end 214 of the second portion 208. That is, the input device 106 of FIG. 2 is positioned on the second housing portion 208 at or adjacent the first end 214 thereof. Each of the first, second, and third portions 206, 208, 210 of the first housing 202 is sometimes referred to as a support portion.

According to the illustrated example of FIG. 2, the first portion 206, the second portion 208, and the third portion 210 of the first housing 202 form and/or define a single-piece component such as, for example, a first plate (sometimes referred to as a back plate). However, in some examples, the first housing 202 is implemented differently. In some such examples, the first portion 206, the second portion 208, and the third portion 210 are components (e.g., plates) that are produced separately and then coupled or assembled together. As such, each of the first portion 206, the second portion 208, the third portion 210, and/or, more generally, the first housing 202 can be implemented using a single plate or multiple plates. Further, each of the first portion 206, the second portion 208, the third portion 210, and/or, more generally, the first housing 202 is constructed of one or more materials (e.g., plastic, metal, etc.) having suitable properties and/or characteristics (e.g., any of strength, rigidity, durability, etc.) sufficient to support one or more such components of the actuator assembly 200.

The linkage mechanism 204 of FIG. 2 is coupled between the actuator 112 and the first lock 114, (b) the second lock 116, or (c) both the first lock 114 and the second lock 116. According to the illustrated example of FIG. 2, the linkage mechanism 204 includes the first link 126, the second link 128, an output or third link 216 (e.g., a control arm) 216, a first adapter (e.g., a clip for a rod or cable) 218, and a second adapter (e.g., a clip for a rod or cable) 218. The third link 216 of FIG. 2 is rotatably coupled to the first housing 202. For example, the actuator assembly 200 of FIG. 2 also includes a hub or bearing (e.g., a ball bearing) 222 operatively interposed between the third link 216 and the third housing portion 210. Accordingly, the third link 216 is rotatable relative a second axis 224 associated with the bearing 222 in a first direction (e.g., counterclockwise) 226 and/or a second direction (e.g., clockwise) 228 opposite the first direction 226. Additionally, the third link 216 of FIG. 2 is configured to receive the output of the actuator 112, for example, via a fourth link (e.g., a rod) 213 of the actuator 112 that extends from the actuator 112 to the third link 216. In particular, the third link 216 is configured to transfer the output from the actuator 112 to the link(s) 126, 128 by pivoting relative to the housing 202.

The first adapter 218 of FIG. 2 is coupled (e.g., movably coupled) to the third link 216, for example, via one or more fasteners and/or fastening methods or techniques. In particular, the first adapter 218 is configured to receive the first link 126 associated with the input portion of the first lock 114. As such, when the first link 126 is inserted into a first receptacle 230 formed by the first adapter 218, the first link 126 connects the third link 216 to the first lock 114. According to the illustrated example of FIG. 2, a force is transmittable through the first link 126 from the first adapter 218 (i.e., the third link 216) to the input portion of the first lock 114 to pull the input portion. That is, movement of the third link 216 pulls the input portion of the first lock 114. As shown in FIG. 2, the first adapter 218 is positioned on the third link 216 and offset relative to the second axis 224.

Additionally, in examples where the locking system 104 includes multiple locks, the second adapter 220 of FIG. 2 is coupled (e.g., movably coupled) to the third link 216, similar to the first adapter 218. In particular, the second adapter 220 is configured to receive the second link 128 associated with the input portion of the second lock 116. As such, when the second link 128 is inserted into a second receptacle 232 formed by the second adapter 220, the second link 128 connects the third link 216 to the second lock 116. According to the illustrated example of FIG. 2, a force is transmittable through the second link 128 from the second adapter 220 (i.e., the third link 216) to the input portion of the second lock 116 to pull the input portion. That is, movement of the third link 216 also pulls the input portion of the second lock 116. As shown in FIG. 2, the second adapter 220 is positioned on the third link 216, opposite relative to the first adapter 218, and offset relative to the second axis 224.

According to the illustrated example of FIG. 2, the actuator 112 is a linear actuator that includes a second housing 234 (sometimes referred to as an actuator housing or a motor housing) and a motor (e.g., an electric motor) 236 in the second housing 234. In such examples, the motor 236 is operatively coupled the fourth link 213 to move the fourth link 213 in and/or out of the second housing 234. As shown, the fourth link 213 extends at least partially into the second housing 234 to connect to the motor 236 or a gear box operatively interposed between the fourth link 213 and the motor 236. In particular, the motor 236 of FIG. 2 is configured to generate, based on the electrical power, the output and apply the output to the fourth link 213, for example, directly or via the gear box. Further, in response to receiving the output, the fourth link 213 is configured to apply the output to the third link 216, thereby rotating the third link 216 relative to the second axis 224 and/or urging the link(s) 126, 128 away from the respective lock(s) 114, 116. Stated differently, the fourth link 213 of FIG. 2 is configured to transfer the output from the actuator 112 to the third link 216. Additionally, the second housing 234 of FIG. 2 is positioned on and/or coupled to the first portion 206 of the first housing 202

In some examples, to facilitate powering the motor 236, the actuator 112 of FIG. 2 includes a connector (e.g., electrical power connector) 238. As shown in FIG. 2, the connector 238 is positioned on and/or coupled to the second housing 234. In particular, the connector 238 of FIG. 2 is configured to receive a transmission wire or cable 240 (as represented by the dotted/dashed lines of FIG. 2) that is connected to the relay 110 and/or the power source. According to the illustrated example of FIG. 2, the electrical power is transmittable through the cable 240 from the relay 110 to the motor 236, which enables the motor 236 to generate the output.

In some examples, to facilitate supporting components of the input device 106, the input device 106 includes a third housing 242 and one or more mounting portions 244, 246 coupled to the third housing 242, two of which are shown in this example. In other words, the third housing includes a first mounting portion (e.g., a flange) 244 and a second mounting (e.g., a flange) 246. The third housing 242 contains and/or supports one or more electrical components of the input device 106. Further, the mounting portion(s) 244, 246 facilitate mounting the input device 106 on the second housing portion 208. As shown in FIG. 2, the first and second mounting portions 244, 246 are positioned on opposite sides of the third housing 242 and extend away from each other.

According to the illustrated example of FIG. 2, the first housing 202 includes a first aperture 248 positioned thereon between the first and second mounting portions 244, 246, as represented by the dotted/dashed lines of FIG. 2. For example, the second housing portion 208 of FIG. 2 forms and/or defines the first aperture 248. In particular, the first aperture 248 of FIG. 2 is sized and/or shaped to receive at least a portion of the third housing 242. As such, the third housing 242 of FIG. 2 extends through the first aperture 248 (see also FIG. 4).

In some examples, the actuator assembly 200 also includes a first fastening mechanism 250 coupling (e.g., removably coupling) the actuator 112 to the first portion 206 of the first housing 202. The first fastening mechanism 250 of FIG. 2 can be implemented, for example, using at least one fastener such as a bolt, a stud, a nut, a rivet, a screw, a snap-fit component, a weld, an adhesive, etc., or a combination thereof. According to the illustrated example of FIG. 2, the first fastening mechanism 250 includes one or more fasteners 252, 254 extending at least partially through the first housing portion 206 and the second housing 234, two of which are shown in this example. Although FIG. 2 depicts the two fasteners 252, 254, in some examples, the first fastening mechanism 250 is implemented differently to sufficiently couple the second housing 234 to the first housing 202.

Further, in some examples, the actuator assembly 200 also includes a second fastening mechanism 256 coupling (e.g., removably coupling) the input device 106 to the second portion 208 of the first housing 202. The second fastening mechanism 256 of FIG. 2 can be implemented, for example, using at least one fastener such as a bolt, a stud, a nut, a rivet, a screw, a snap-fit component, a weld, an adhesive, etc., or a combination thereof. According to the illustrated example of FIG. 2, the second fastening mechanism 256 includes one or more primary fasteners 258, 260 extending at least partially through the second housing portion 208 and/or a portion of the third housing 242, two of which are shown in this example (i.e., a first primary fastener 258 and a second primary fastener 260). As shown in FIG. 2, the first primary fastener 258 of the second fastening mechanism 256 extends through the first mounting portion 244. Further, the second primary fastener 260 of the second fastening mechanism 256 of FIG. 2 extends through the second mounting portion 246. Additionally, in some such examples, the second fastening mechanism 256 of FIG. 2 also includes one or more secondary fasteners 262, 264 threadably coupled to respective one(s) of the primary fastener(s) 258, 260, two of which are shown in this example (i.e., a first secondary fastener 262 and a second secondary fastener 264).

According to the illustrated example of FIG. 2, the second fastening mechanism 256 includes a first joint (e.g., a bolted joint) 266. The first joint 266 of FIG. 2 is formed by any (e.g., all) of (a) the second housing portion 208, (b) the first mounting portion 244, (c) the first primary fastener 258, (d) the first secondary fastener 262, or (e) a combination thereof. In such examples, the first mounting portion 244 includes a second aperture 270 (as represented by the dotted/dashed lines of FIG. 2) positioned thereon through which the first primary fastener 258 extends. According to the illustrated example of FIG. 2, the second aperture 270, the first primary fastener 258, and the first secondary fastener 262 are substantially aligned relative to each other.

Additionally, in some examples, the second fastening mechanism 256 includes a second joint (e.g., a bolted joint) 268. The second joint 268 of FIG. 2 is formed by any (e.g., all) of (a) the second housing portion 208, (b) the second mounting portion 246, (c) the second primary fastener 260, (d) the second secondary fastener 264, (e) or a combination thereof. In such examples, the second mounting portion 246 includes a third aperture 272 (as represented by the dotted/dashed lines of FIG. 2) positioned thereon through which the second primary fastener 260 extends. In such examples, the third aperture 272, the second primary fastener 260, and the second secondary fastener 264 are substantially aligned relative to each other, similar to the second aperture 270, the first primary fastener 258, and the first secondary fastener 262.

Although FIG. 2 depicts the primary and secondary fasteners 258, 260, 262, 264, in some examples, the second fastening mechanism 256 is implemented differently to sufficiently couple the third housing 242 (i.e., the input device 106) to the first housing 202. In some such examples, each of the first joint 266 and/or the second joint 268 includes a clinched joint, a welded joint, etc., or a combination thereof.

Further, in some examples, the actuator assembly 200 also includes a third fastening mechanism 274 configured to couple (e.g., removably couple) the first housing 202 to a vehicle body (e.g., the vehicle body 412 discussed below) such as, for example, a portion of the gate 102 or door 118. The third fastening mechanism 274 of FIG. 2 can be implemented, for example, using at least one fastener such as a bolt, a stud, a nut, a rivet, a screw, a snap-fit component, a weld, an adhesive, etc., or a combination thereof. As shown in FIG. 2, the third fastening mechanism 274 includes one or more secondary fasteners 276, 278, two of which are shown in this example (i.e., a third secondary fastener 276 and a fourth secondary fastener 278). In particular, the secondary fastener(s) 276, 278 of the third fastening mechanism 274 are configured to receive respective primary fastener(s), which is discussed further below in connection with FIG. 4.

According to the illustrated example of FIG. 2, each of the first, second, and third portions 206, 208, 210 of the first housing 202 is substantially planar. That is, the first housing portion 206 has a first thickness that varies by a relatively small amount (e.g., by +/−5% of a value corresponding to a desired thickness) or is uniform at least partially across a dimension (e.g., a length and/or a width) of the first housing portion 206, for example, from the first end 212 to a second end 282 of the first housing portion 206 opposite the first end 212. Similarly, in such examples, the second housing portion 208 has a second thickness (e.g., the same or different relative to the first thickness 280) 284 that varies by a relatively small amount or is uniform at least partially across a dimension (e.g., a length and/or a width) of the second housing portion 208, for example, from the first end 214 to a second end 286 of the second housing portion 208 opposite the first end 214.

Figure 3:
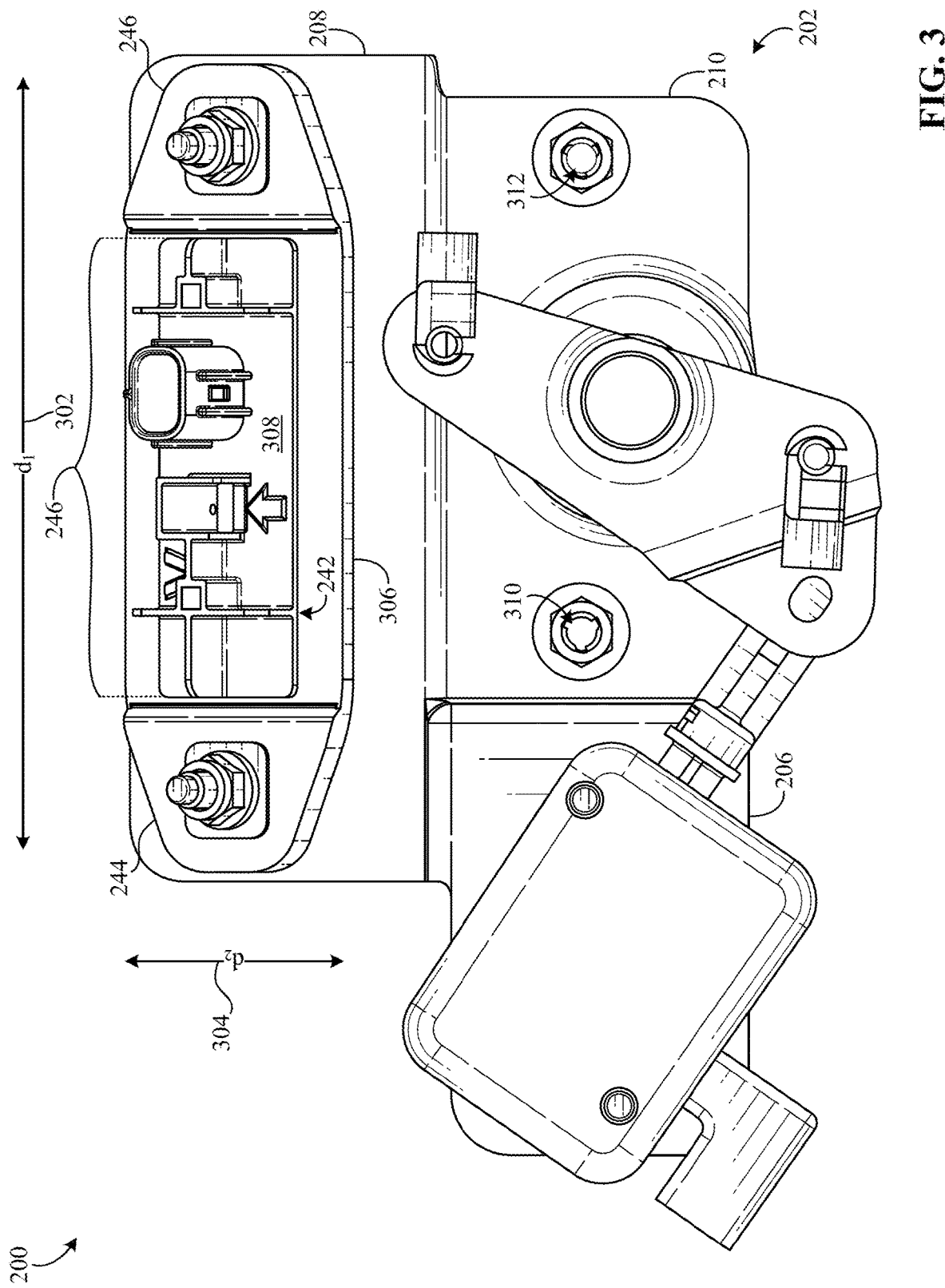

FIG. 3 is another view of the actuator assembly 200 of FIG. 2. According to the illustrated example of FIG. 3, the first and second mounting portions 244, 246 form a second plate 306 couple to and/or supporting the third housing 242. The second plate 306 of FIG. 3 is positioned at or adjacent a first end 308 of the third housing 242 and surrounds the third housing 242. As such, each of the first mounting portion 244 and/or the second mounting portion 246 is also positioned at or adjacent the first end 308 of the third housing 242. As shown in FIG. 3, the second plate 306 is oblong and/or has a shape that is substantially oblong. That is, the second plate 306 has a first dimension (e.g., a length) 302 that is less than or greater than a second dimension (e.g., width) 304 of the second plate 306. Further, the second plate 306 of FIG. 3 has a thickness that is substantially uniform or varies at least partially across the dimension(s) 302, 304 of the second plate 306, for example, from the first mounting portion 244 to the second mounting portion 246.

In some examples, to facilitate forming a joint, the first housing 202 includes a fourth aperture 310 positioned on and/or formed by the third housing portion 210. In particular, the fourth aperture 310 is sized and/or shaped to receive a fastener associated with the third fastening mechanism 274, as discussed further below. Additionally, in some examples, the first housing 202 includes a fifth aperture 312 positioned on and/or formed by the third housing portion 210. As shown in FIG. 3, the fifth aperture 312 is spaced from the fourth aperture 310 by a distance. In particular, the fifth aperture 312 is sized and/or shaped to receive a different fastener associated with the third fastening mechanism.

Figure 4:
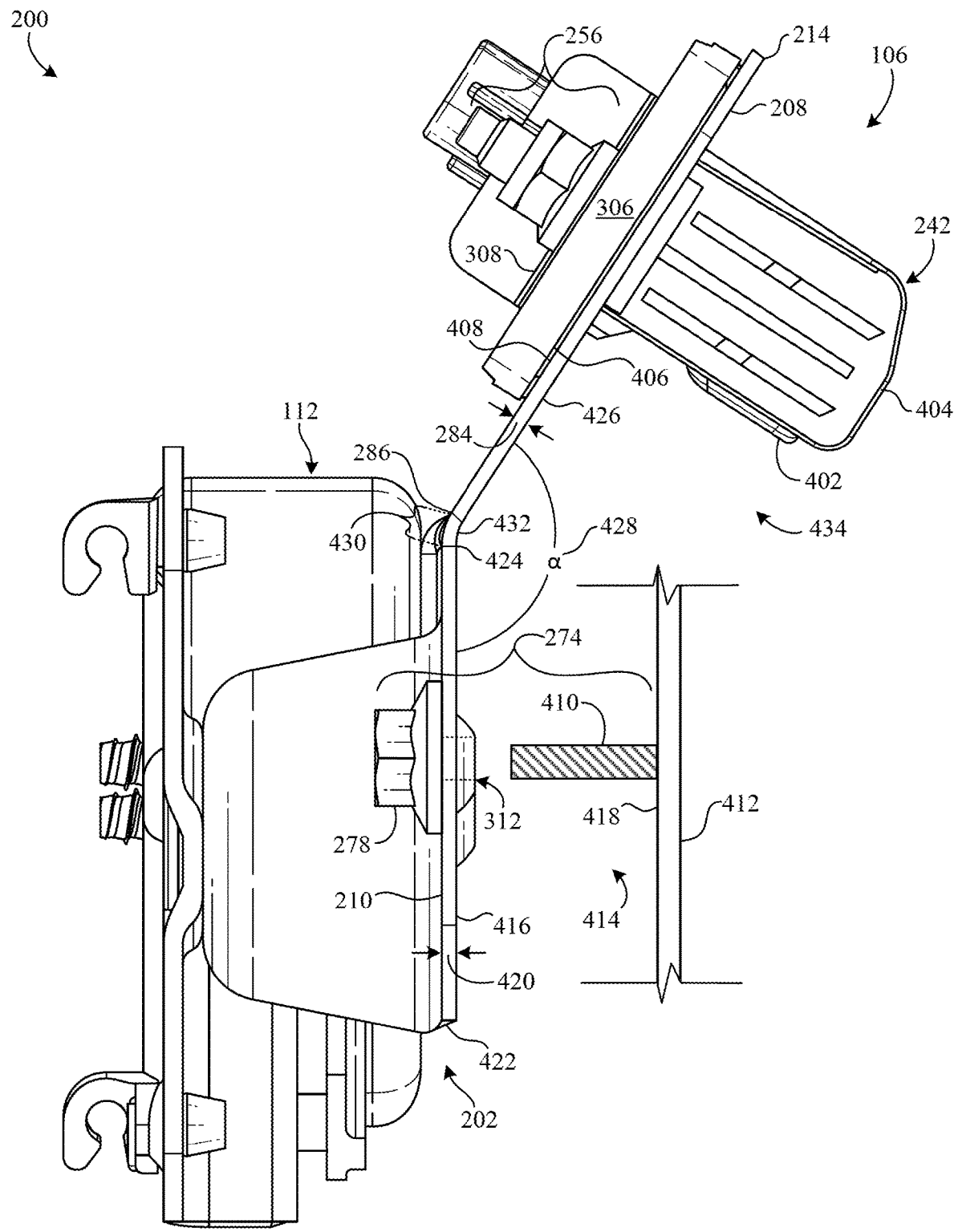

FIG. 4 is another view of the actuator assembly 200 of FIG. 2. According to the illustrated example of FIG. 4, the input device 106 includes one or more (e.g., two) buttons 402 operatively coupled to the third housing 242, one of which is shown in this example. As shown in FIG. 4, the button(s) 402 are positioned adjacent a second end 404 of the third housing 242 opposite the first end 308. In some examples, the button(s) 402 of FIG. 4 are connected to a switch of the input device 106. In particular, the input device 106 is configured to activate when the user presses and/or imparts a force on the button(s) 402. Such activation of the input device 106 causes the actuator 112 change the state(s) of the respective lock(s) 114, 116.

As shown in FIG. 4, the input device 106 and the second housing portion 210 are assembled via the second fastening mechanism 256. According to the illustrated example of FIG. 4, at least a portion (e.g. the second mounting portion 246) the second plate 306 defines a first mating or mounting surface (e.g., a relatively flat or planar surface) 406, and the second housing portion 208 defines a second mating or mounting surface (e.g., a relatively flat or planar surface) 408 engaging the first mounting surface 406. The first mounting surface 406 of FIG. 4 faces the second mounting surface 408. As such, the first and second mounting surfaces 406, 408 form an interface at which the input device 106 and the first housing 202 abut each other.

According to the illustrated example of FIG. 4, the third fastening mechanism 274 also includes one or more primary fasteners 410 positioned a vehicle body 412, one of which is shown in this example (i.e., a third primary fastener 410). The vehicle body 412 of FIG. 4 corresponds to a portion of the vehicle 100 such as, for example, the gate 102 or the door 118. Each of the primary fastener(s) 410 of the third fastening mechanism 274 is coupled to the vehicle body 412, for example, via welding. As such, each of the primary fastener(s) 410 of the third fastening mechanism 274 can be implemented using a weld stud. In particular, the third primary fastener 410 of the third fastening mechanism 274 is configured to extend through the fifth aperture 312 and threadably couple to the fourth secondary fastener 278 of the third fastening mechanism 274, thereby coupling the first housing 202 to the vehicle body 412.

According to the illustrated example of FIG. 4, the third fastening mechanism 274 includes a third joint (e.g., bolted joint) 414 when the first housing 202 and the vehicle body 412 are assembled. In such examples, the third joint 414 of FIG. 4 is formed by any (e.g., all) of (a) the third housing portion 210, (b) the vehicle body 412, (c) the third primary fastener 410, (d) the fourth secondary fastener 278, or (e) a combination thereof. According to the illustrated example of FIG. 2, the fifth aperture 312, the third primary fastener 410, and the fourth secondary fastener 278 are substantially aligned relative to each other. As such, the third primary fastener 410 can extend through the fifth aperture 312 to receive the fourth secondary fastener 278.

Although FIG. 4 depicts aspects in connection with the third primary fastener 410 and the fourth secondary fastener 278, in some examples, such aspects likewise apply to the other primary fastener 410 and the third secondary fastener 276. For example, the third fastening mechanism 274 includes a fourth joint associated with the other primary fastener 410 and the third secondary fastener 276, similar to the third joint 414.

According to the illustrated example of FIG. 4, the third housing portion 210 defines a third mating or mounting surface (e.g., a relatively flat or planar surface) 416. Further, the vehicle body 412 of FIG. 4 defines a fourth mating or mounting surface (e.g., a relatively flat or planar surface) 418 that is configured to engage the third mounting surface 416 when first housing 202 and the vehicle body 412 are assembled via the third fastening mechanism 274. The third mounting surface 416 of FIG. 4 faces the fourth mounting surface 418. As such, the third and fourth mounting surfaces 416, 418 form an interface at which the first housing 202 and the vehicle body 412 abut each other.

In some examples, the third housing portion 210 is substantially planar, as previously mentioned. That is, in such examples, the third housing portion 210 has a third thickness (e.g., the same or different relative to the first and second thicknesses 280, 284) 420 that varies by a relatively small amount or is uniform at least partially across the third housing portion 208, for example, from a first end 422 of the third housing portion 210 to a second end 424 of the third housing portion 210 opposite the first end 422. Additionally, in such examples, the second housing portion 208 is angled and/or curved relative to third housing portion 210, as shown in FIG. 4. In such examples, the second housing portion 208 defines a surface (e.g., a relatively flat or planar surface) 426. In particular, the surface 426 and the third mounting surface 416 form an angle 428, for example, that is between about 90 degrees and about 270 degrees.

As shown in FIG. 4, the first housing 202 includes a connecting portion 430 coupling the second and third housing portions 208, 210 together. The connecting portion 430 of FIG. 4 is connected between the second end 286 of the second housing portion 208 and the second end 424 of the third housing portion 210. In such examples, the connecting portion 430 includes a curvature 432 that is sized and/or shaped to provide the angle 428. Additionally, in such examples, when assembled, the second housing portion 208, the third housing 242, and the vehicle body 412 form a space 434, which facilitates user interaction with the input device 106. For example, the user can reach for and/or otherwise access the button(s) 402 via the space 434. In such examples, the space 434 of FIG. 4 is external to the cabin of the vehicle 100 and/or exposed to the environment.

Figure 5:
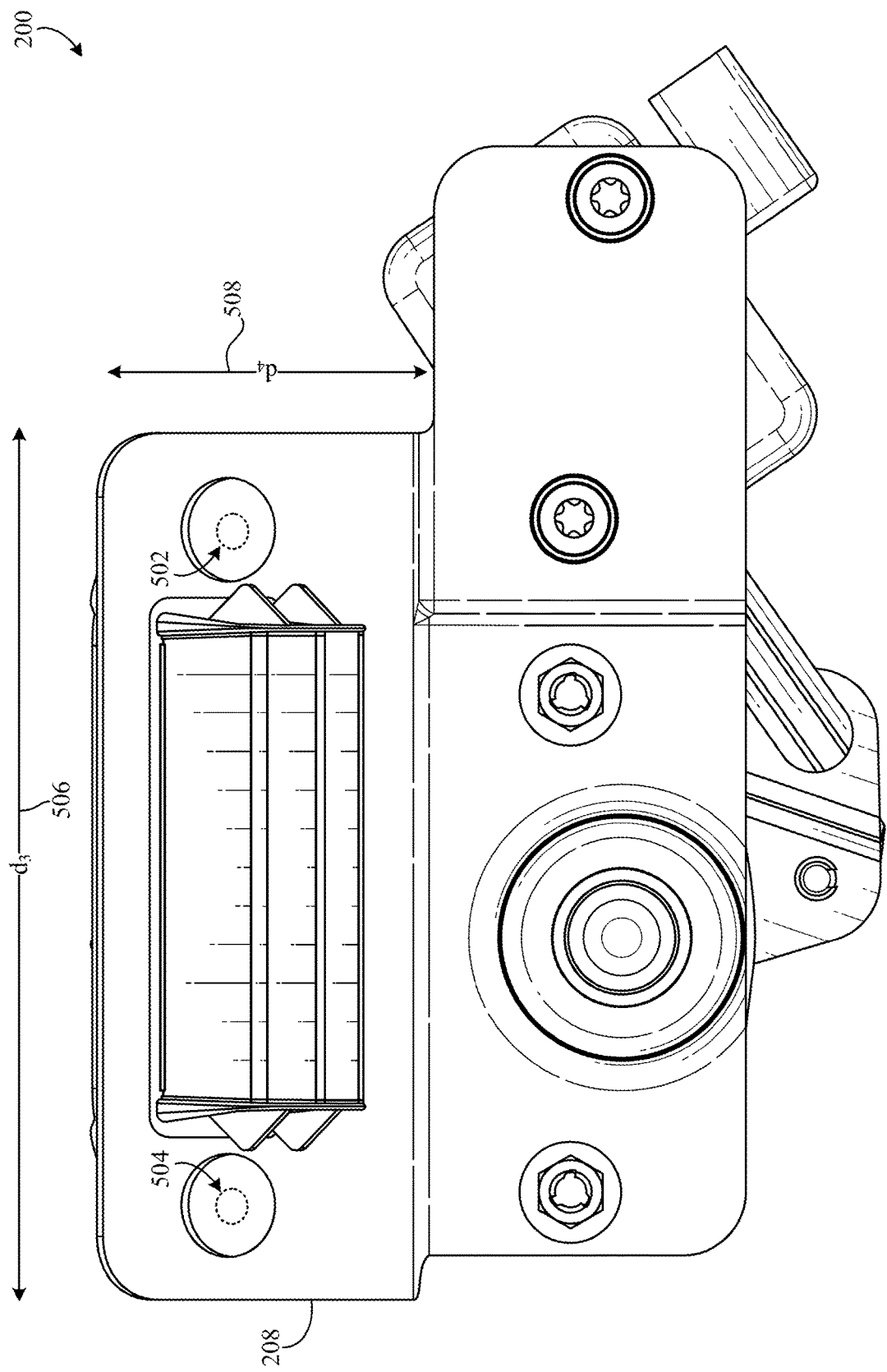

FIG. 5 is another view of the actuator assembly 200 of FIG. 2. In some examples, the first housing 202 includes a sixth aperture 502 (as represented by the dotted/dashed lines of FIG. 5) through which the first primary fastener 258 extends. The sixth aperture 502 of FIG. 5 is positioned on and/or formed by the third housing portion 210. As such, the sixth aperture 502 is sized and/or shaped to receive the first primary fastener 258. In particular, the sixth aperture 502 of FIG. 5 is aligned to the second aperture 270 of the first mounting portion 244. That is, the sixth aperture 502 is particularly positioned (e.g., centered or slightly offset) relative to the second aperture 270 such that the first primary fastener 258 can extend through the second the aperture 270 and the sixth aperture 502 to receive the first secondary fastener 262.

Additionally, in some such examples, the first housing 202 also includes seventh aperture 504 (as represented by the dotted/dashed lines of FIG. 5) through which the second primary fastener 260 extends. The seventh aperture 504 of FIG. 5 positioned on and/or formed by the third housing portion 210. As such, the seventh aperture 504 is sized and/or shaped to receive the second primary fastener 260. In particular, the seventh aperture 504 of FIG. 5 is aligned to the third aperture 272 of the second mounting portion 246. That is, the seventh aperture 504 is particularly positioned (e.g., centered or slightly offset) relative to the third aperture 272 such that the second primary fastener 260 can extend through the second the third aperture 272 and the seventh aperture 504 to receive the second secondary fastener 264.

As shown in FIG. 5, the second housing portion 208 is oblong and/or has a shape this substantially oblong, similar to the second plate 306. That is, the second housing portion 208 has a third dimension (e.g., a length) 506 that is less than or greater than a fourth dimension (e.g., width) 508 of the second housing portion 208. In such examples, the second housing portion 208 is substantially larger than the second plate 306 to provide a sufficient area of the second mounting surface 408. Additionally, in some examples, each of the first housing portion 206 and/or the third housing portion 210 is also oblong. However, in some examples, any (e.g., all) of the first housing portion 206, the second housing portion 208, the third housing portion 210, and/or the second plate 306 is/are sized and/or shaped differently.

As used herein, the term "mounting feature" refers to one of (a) the primary fastener(s) 258, 260, 410, (b) the secondary fastener(s) 262, 264, 276, 278, or (c) the aperture(s) 270, 272, 310, 312

As used herein, the terms "including" and "comprising" (and all forms and tenses thereof) are to be open ended terms. Thus, whenever a claim employs any form of "include" or "comprise" (e.g., comprises, includes, comprising, including, has, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended.

Figure 6:
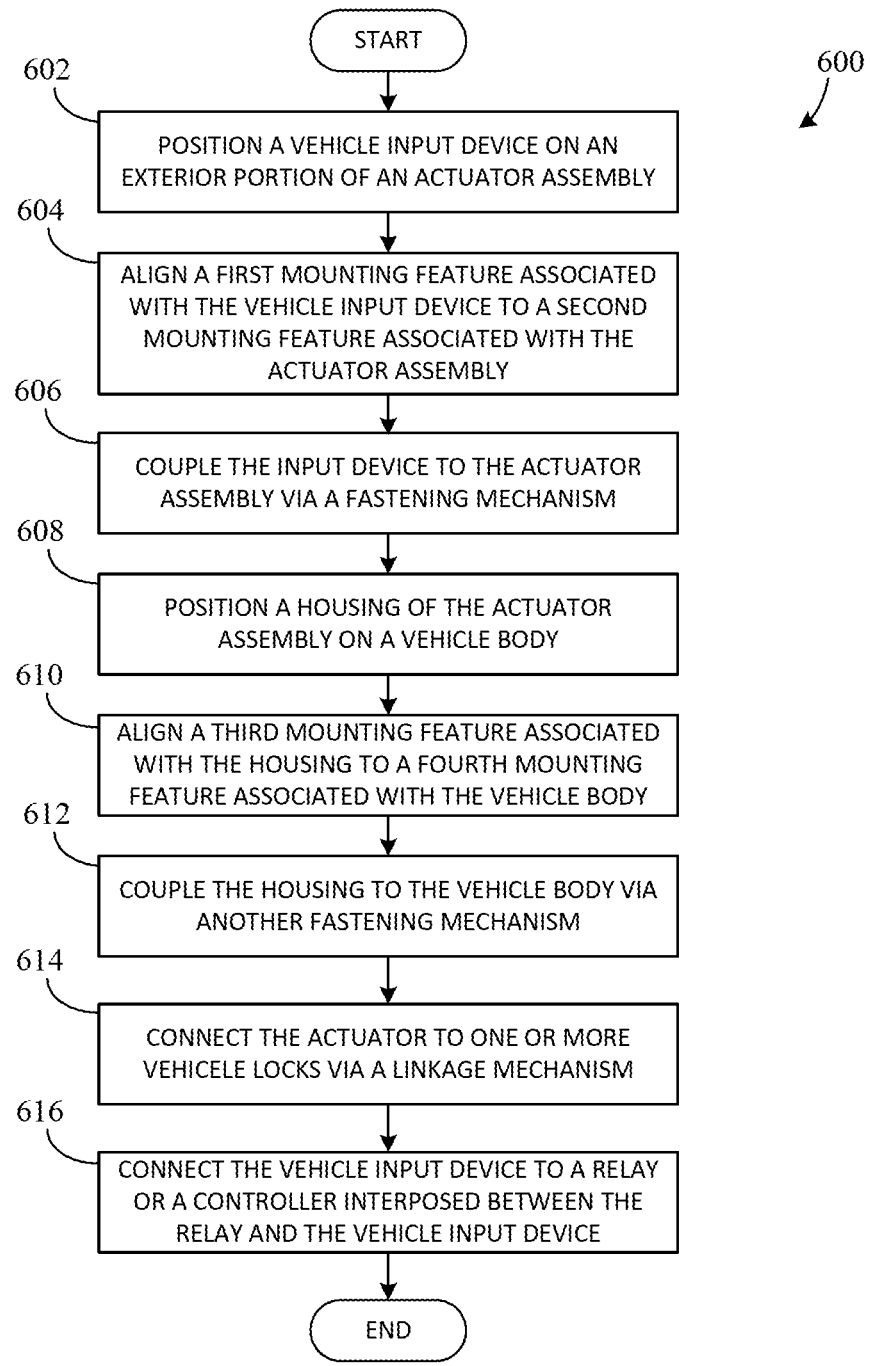
FIG. 6 is a flowchart representative of an example method that can be executed to implement the example actuator assembly of FIGS. 2-5.

FIG. 6 is a flowchart representative of an example method 600 that can be executed to implement the actuator assembly 200 of FIG. 2. The example method 600 of FIG. 6 can be implemented in the vehicle 100 of FIGS. 1A and 1B and/or the locking system 104 of FIGS. 1A and 1B.

The example method 600 of FIG. 6 begins by positioning a vehicle input device on an exterior portion of an actuator assembly (block 602). In some examples, the input device 106 is positioned on the second portion 208 of the first housing 202 of the actuator assembly 200 (e.g., see FIG. 2).

The example method 600 of FIG. 6 also includes aligning a first mounting feature associated with the vehicle input device to a second mounting feature associated with the actuator assembly (block 604). In some examples, the second aperture 270 of the first mounting portion 244 is aligned to the sixth aperture 502 of the first housing 202. Additionally, in some examples, the third aperture 272 of the second mounting portion 246 is aligned to the seventh aperture 504 of the first housing 202. In such examples, the first mounting surface 406 of the second plate 306 of FIG. 4 may contact the second mounting surface 408 of the second housing portion 208.

The example method 600 of FIG. 6 also includes coupling the input device to the actuator assembly via a fastening mechanism (block 606). In some example, the input device 106 is coupled to the actuator assembly 200 via the second fastening mechanism 256. In such examples, the first primary fastener 258 is inserted through the second and sixth apertures 270, 502. Then, the first secondary fastener 262 is positioned on an end of the first primary fastener 258 and couples to the first primary fastener 258, which forms the first joint 266. Thus, in some examples at block 606, the example method 600 of FIG. 6 also includes forming the first joint 266 via any (e.g., all) of (a) the second housing portion 208, (b) the first mounting portion 244, (c) the first primary fastener 258, (d) the first secondary fastener 262, or (e) a combination thereof.

Additionally, in some examples, the second primary fastener 260 is inserted through the third and seventh apertures 272, 504. Then, the second secondary fastener 264 is positioned on an end of the second primary fastener 260 and couples to the second primary fastener 260, which forms the second joint 268. Thus, in some examples at block 606, the example method 600 of FIG. 6 also includes forming the second joint 268 via any (e.g., all) of (a) the second housing portion 208, (b) the second mounting portion 246, (c) the second primary fastener 260, (d) the second secondary fastener 264, (e) or a combination thereof.

The example method 600 of FIG. 6 also includes positioning a housing of the actuator assembly on a vehicle body (block 608). In some examples, the first housing 202 is positioned on the vehicle body 412 (e.g., see FIG. 4).

The example method 600 of FIG. 6 also includes aligning a third mounting feature associated with the housing to a fourth mounting surface associated with the vehicle body (block 610). In some examples, at least the fifth aperture 312 of the first housing 202 is aligned to the third primary fastener 410 positioned on the vehicle body 412. In such examples, the third mounting surface 416 of the first housing 202 may contact the fourth mounting surface 418 of the vehicle body 412.

The example method 600 of FIG. 6 also includes coupling the housing to the vehicle body via another fastening mechanism (block 612). In some example, the first housing 202 is coupled to the vehicle body 412 via the third fastening mechanism 274 (e.g., see FIG. 4). In such examples, at least the third primary fastener 410 is inserted through the fifth aperture 312. Then, the fourth secondary fastener 278 is positioned on an end of the third primary fastener 410 and couples to the third primary fastener 410, which forms the third joint 414. Thus, in some examples at block 612, the example method 600 of FIG. 6 also includes forming the third joint 414 (and/or one or more other similar joints) via any (e.g., all) of (a) the third housing portion 210, (b) the vehicle body 412, (c) the third primary fastener 410, (d) the fourth secondary fastener 278, or (e) a combination thereof.

The example method 600 of FIG. 6 also includes connecting the actuator to one or more vehicle locks via a linkage mechanism (block 614). In some examples, the actuator 112 is connected to the first lock 114 and/or the second lock 116 via the linkage mechanism 204 (e.g., see FIGS. 1B and 2).

The example method 600 of FIG. 6 also includes connecting the vehicle input device to a relay or a controller interposed between the relay and the vehicle input device (block 616). In some examples, the input device 106 is connected to the relay 110 or the controller 108 interposed between the relay 110 and the input device 106, for example, via the transmission or signal wire, the bus, radio frequency, etc. In particular, after the input device 106 is connected, activation of the input device 106 causes the actuator 112 to change the state of the first lock 114 and/or the state of the second lock 116.

Although the example method 600 is described in connection with the flowchart of FIG. 6, other methods of implementing the locking system 104 may alternatively be used. For example, the order of execution of the blocks 602, 604, 606, 608, 610, 612, 614, 616 may be changed, and/or some of the blocks 602, 604, 606, 608, 610, 612, 614, 616 described may be changed, eliminated, or combined.

It will be appreciated that the systems, apparatus, and methods disclosed in the foregoing description provide numerous advantages. Examples disclosed herein provide a vehicle locking system for an exterior, movable component of a vehicle. Examples disclosed herein incorporate both actuator and input device holding functionality into an actuator assembly of the vehicle locking system. As a result, examples disclosed herein simplify design complexity and/or reduce costs typically associated with such vehicle locking systems.

Although certain example apparatus, systems, and methods have been disclosed herein, the scope of coverage of this patent is not limited thereto. Obviously, numerous modifications and variations are possible in light of the above teachings. It is therefore to be understood that within the scope of the appended claims, the invention may be practiced otherwise than as specifically described herein.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

What is claimed is:

1. A locking system for a vehicle, comprising:
a movable component of the vehicle;
a lock operatively coupled to the movable component;

an actuator assembly including a housing coupled to a vehicle body, an actuator supported by the housing, and a linkage mechanism connecting the actuator to the lock; and an input device supported by the housing, activation of the input device causing the actuator to change a state of the lock, wherein the housing includes a first portion, a second portion, and a third portion, and each of the second portion and the third portion is substantially planar, and the second portion is angled relative to the third portion.

2. The locking system of claim 1, wherein the third portion is coupled between the first and second portions, the first portion extending away from the third portion to receive the actuator adjacent an end of the first portion, the second portion extending away from the third portion to receive the input device adjacent an end of the second portion.

3. The locking system of claim 2, wherein the first portion, the second portion, and the third portion of the housing form a plate.

4. The locking system of claim 2, wherein the actuator assembly includes a fastening mechanism coupling the input device to the second portion of the housing.

5. The locking system of claim 4, wherein the fastening mechanism includes a joint formed by the second portion of the housing, a mounting portion of the input device, and at least one fastener.

6. The locking system of claim 5, wherein the joint includes a bolted joint.

7. The locking system of claim 2, wherein the actuator assembly includes a fastening mechanism coupling the third portion of the housing to the vehicle body.

8. The locking system of claim 7, wherein the fastening mechanism includes a joint formed by the vehicle body, the third portion of the housing, and at least one fastener.

9. The locking system of claim 8, wherein the joint includes a bolted joint.

10. The locking system of claim 1, wherein the movable component includes a gate.

11. The locking system of claim 10, further including a second lock operatively coupled to the gate, and wherein:
the linkage mechanism connects the actuator to the second lock, and
the input device is configured to control the actuator to change a state of the second lock.

12. The locking system of claim 1, wherein the input device includes a switch positioned exterior relative to the vehicle.

13. The locking system of claim 1, further including a switching device interposed between the actuator and a power source of the vehicle, the switching device providing electrical power to the actuator when the switching device receives an electrical current from (a) the input device or (b) a controller communicatively coupled to the input device.

14. An apparatus, comprising:
an input device for a vehicle lock; and
an actuator assembly including an actuator connected to the vehicle lock, the actuator configured to change a state of the vehicle lock when a user interacts with the input device, the actuator assembly including a housing supporting the input device and the actuator, the input device positioned on an exterior portion of the housing,
wherein the housing includes a first portion, a second portion, and a third portion, and each of the second portion and the third portion is substantially planar, and the second portion is angled relative to the third portion.

15. The apparatus of claim 14, wherein the actuator assembly includes a fastening mechanism coupling the input device to the exterior portion of the housing.

16. The apparatus of claim 14, wherein the actuator assembly includes a fastening mechanism configured to couple the housing to a vehicle body.

17. A method for assembling an actuator assembly of a vehicle locking system, comprising:
coupling an actuator of the actuator assembly to a housing of the actuator assembly;
coupling an input device to the housing;
coupling the housing to a vehicle body;
connecting the actuator to a vehicle lock that is operatively coupled to a movable vehicle component; and
connecting the input device to the actuator, activation of the input device causing the actuator to change a state of the vehicle lock,
wherein the housing includes a first portion, a second portion, and a third portion, and each of the second portion and the third portion is substantially planar, and the second portion is angled relative to the third portion.

18. The method of claim 17, further including forming a joint via a portion of the housing, a portion of the input device, and at least one fastener.

19. The method of claim 17, further including forming a joint via a portion of the housing, a portion of a vehicle body, and at least one fastener.

* * * * *